Nov. 28, 1950 H. W. PRICE 2,531,701
TRANSMISSION OPERATING MECHANISM
Original Filed Jan. 13, 1943 5 Sheets-Sheet 1

INVENTOR.
HAROLD W. PRICE
BY
H O Clayton
ATTORNEY

INVENTOR
HAROLD W. PRICE
BY
ATTORNEY

Nov. 28, 1950 H. W. PRICE 2,531,701
TRANSMISSION OPERATING MECHANISM
Original Filed Jan. 13, 1943 5 Sheets-Sheet 5

INVENTOR.
HAROLD W. PRICE
BY H. J. Clayton
ATTORNEY

Patented Nov. 28, 1950

2,531,701

UNITED STATES PATENT OFFICE 2,531,701

TRANSMISSION OPERATING MECHANISM

Harold W. Price, Bradenton, Fla., assignor to Bendix Aviation Corporation, South Bend, Ind., a corporation of Delaware Original application January 13, 1943, Serial No. 472,199. Divided and this application December 12, 1947, Serial No. 791,197

10 Claims. (Cl. 74—745)

This invention relates in general to transmission operating mechanism and more particularly to means for operating a six speeds forward and two speeds reverse transmission mechanism constituting a part of the power plant of a motor vehicle.

One of the objects of my invention is to provide an improved mechanism for obtaining the several speed ratios provided by the speed changing mechanism of a tank used for military purposes. It is apparent, however, that the transmission operating mechanism constituting my invention is not limited to use in a tank, for said mechanism may, with no changes in construction, be used to operate the change-speed transmission of an automotive vehicle.

My invention also contemplates the provision of means, including a plurality of pressure differential operated motors, for operating the change-speed transmission mechanism of a motor vehicle, said mechanism being capable of being established in any one of six forward speed settings or in either one of two reverse speed settings and including three separate nests of gears or transmission units, the gears of each nest being operable to either establish one or the other of two gear ratio settings.

Yet another object of my invention is to provide a mechanism adapted to operate a six speeds forward and two speeds reverse transmission including two series connected transmission units, said mechanism comprising two manually operable levers successively operable in two different planes to effect the operation of one of said units, one of said levers being then operable in another plane to effect the operation of the other of said units.

Yet another object of my invention is to provide means for operating a six speeds forward and two speeds reverse transmission mechanism of a motor vehicle, said transmission mechanism including three separate cranks extending from the casing of the transmission; and a further object of my invention is to provide three separate force transmitting means for operating the aforementioned three cranks and also to provide a manually operable selector lever mechanism and interlock mechanism for operating and controlling the operation of said force transmitting means, the parts of said lever and interlock mechanism being so constructed and arranged and so operative that one of said cranks and one or the other of two of said cranks are actuated before the remaining crank may be actuated.

A further object of my invention is to so construct and arrange the parts of the transmission operating mechanism constituting my invention that one or the other of two of the nests of gears of the aforementioned transmission mechanism may be operated to establish a gear ratio setting when and only when the other of said nests of gears is neutralized.

Yet another object of my invention is to provide power and manually operated means for operating the change-speed transmission mechanism of a motor vehicle, said mechanism having six different forward speed settings and two different reverse gear settings and including among its parts three separate cranks extending from the casing of the transmission mechanism. A further object of my invention is to include in said operating mechanism a manually operable lever member having an H movement.

An additional object of my invention is to provide means for operating a six speeds forward and two speeds reverse transmission including a plurality of transmission units, said means including one lever member movable in a plurality of different planes and further including another lever member movable in but one plane; and a further object of my invention is to so construct the connections between said levers and the transmission mechanism as to make it impossible to move the latter lever to establish one of the transmission units in gear until the former lever is moved to neutralize another of the transmission units.

Yet another object of my invention is to provide power means for operating a multi-speed transmission mechanism of a motor vehicle, said power means including a plurality of pressure differential operated motors, a selector lever, a follow-up valve for controlling the operation of each motor and means so interconnecting the selector lever, transmission mechanism, valve, and the power element of each motor that the operator in moving the selector lever to operate the transmission mechanism encounters a resistance or so-called feel which is directly proportional to the transmission operating force exerted by the pressure differential operated motor in operation.

Yet another object of my invention is to provide, in the power plant of a motor vehicle, means for operating three different transmission units or nests of gears of a six speeds forward and two speeds reverse transmission mechanism, said means including three separate cranks extending from the casing of the transmission mechanism, two manually operated selector levers positioned adjacent the driver's seat of the vehicle and three separate force transmitting means interconnecting said cranks and levers.

A further object of my invention resides in the provision of an improved selector control mechanism for use with a change-speed transmission having eight different gear ratio settings, said mechanism being adapted for manual control with a minimum of effort and a maximum of safety to the operating parts. Yet another object of my invention is to so construct said selector control mechanism that the same is manipulated with a minimum of effort and attention on the part of the driver thereby increasing the safety of vehicle driving and the comfort of the driver.

Another object of the invention is to provide means, including a selector lever member positioned adjacent the driver of a motor vehicle and having an H movement, for operating a change-speed transmission mechanism which may, by the operation of two cranks, be established in any one of three forward gear settings or a reverse gear setting and which may then, by the operation of another crank, be established in one or the other of two settings thereby providing a transmission capable of being established in any one of six forward gear settings or either one or the other of two reverse gear settings.

The above and other objects and features of the invention will appear more fully hereinafter from a consideration of the following description taken in connection with the accompanying drawings wherein two embodiments of the invention are illustrated by way of example.

Figure 4 is a sectional view, taken on the line 4—4 of Figure 2 disclosing details of the interlock mechanism of the invention disclosed in the latter figure;

Figures 1, 2:
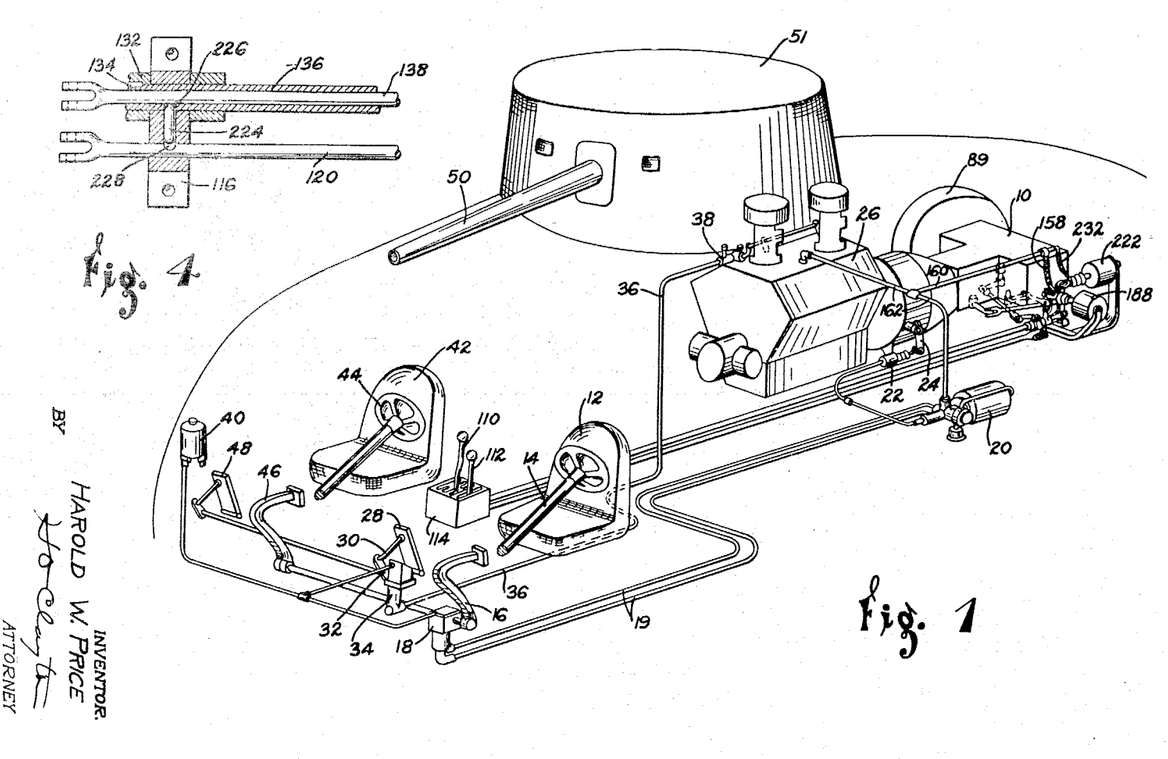
Figure 1 is a perspective view diagrammatic in form illustrating my transmission operating mechanism incorporated in the power plant of a tank.
Figure 2 is a view, somewhat diagrammatic in form, disclosing one embodiment of the transmission operating mechanism constituting my invention.

Referring now to Figure 1 there is disclosed in this figure a portion of the power plant of a military tank, said lower plant including the transmission operating mechanism constituting my invention. It is to be understood, however, that my invention is not limited in its use to a tank; for it is obvious that both the change-speed transmission 10 and the means for operating it, all as disclosed in Figure 1, might be incorporated in the power plant of an automotive vehicle, i. e. a bus or a heavy-duty truck.

Completing the description of the power plant disclosed in Figure 1, the driver is seated in a seat 12 immediately to the rear of a steering wheel 14. A manually operated clutch pedal 16, serves through the intermediary of a hydraulic master cylinder 18 and fluid transmitting conduits 19 to control the operation of a hydraulic and vacuum operated motor 20, said motor serving, through the intermediary of a hydraulic slave cylinder 22, to operate a clutch mechanism, not shown, actuated by a crank 24. This clutch mechanism, preferably of the friction type, serves to interconnect an internal combustion engine 26 with the aforementioned six speeds forward and two speeds reverse transmission disclosed in detail in Figure 10. The accelerator 28 which may be operated by the right foot of the driver, serves, by means of a link 30 and a crank 32, to operate a hydraulic master cylinder 34, the latter being connected, by a fluid transmitting conduit 36, with a throttle operating hydraulic slave cylinder 38. The throttle mechanism, not shown, operated by the cylinder 38, constitutes a part of the means for controlling the operation of the engine 26. The clutch and throttle master cylinders 18 and 34 may be supplied with their power fluid from a fluid reservoir 40.

If desired, the tank may, as disclosed in Figure 1, be provided with a supplementary set of controls mounted adjacent an assistant driver's seat 42. These controls preferably include a steering wheel 44, a clutch pedal 46 and an accelerator 48 connected respectively with the above described steering wheel 14, clutch pedal 16 and accelerator 28. The clutch and throttle controls of the driver and assistant driver are shown mechanically interconnected. A cannon 50 is shown extending from an opening in a turret 51 and the tank is of course also armed with machine guns, not shown.

Figure 10:
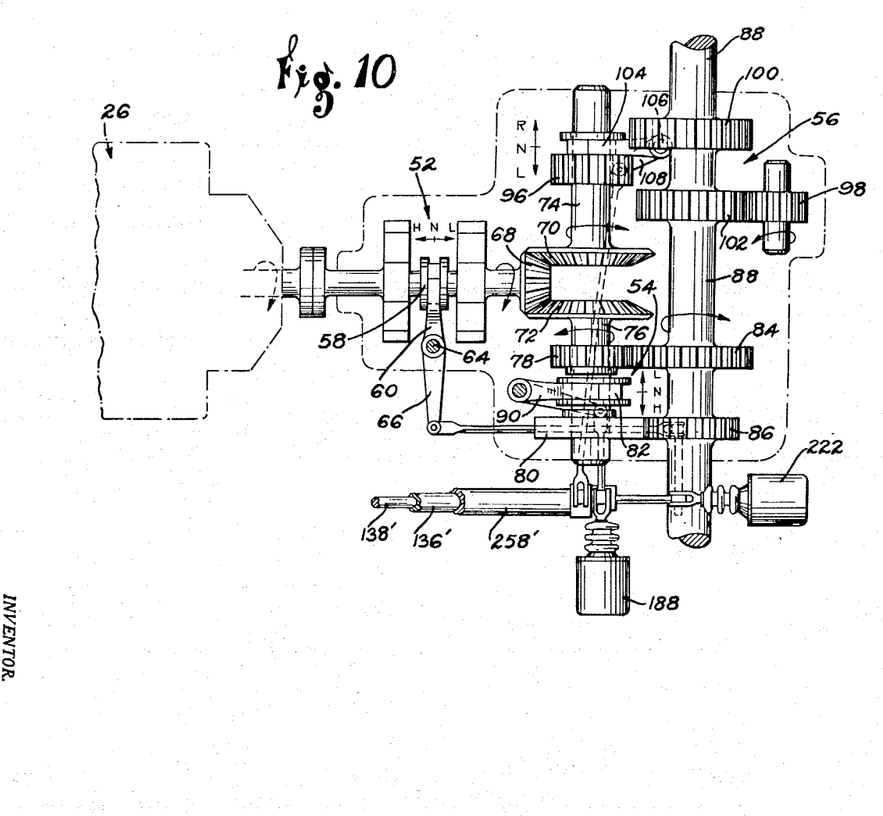
Figure 10 is a plan view of one form of six speeds forward and two speeds reverse transmission, which transmission is operated by the transmission operating mechanism constituting my invention.

The power plant of the tank disclosed in Figure 1 has only been briefly described inasmuch as my invention resides in the hereinafter described and claimed mechanism, two embodiments of which are disclosed in the drawings, for operating a six speeds forward and two speeds reverse transmission, such for example as the transmission disclosed in Figure 10.

Describing now this transmission mechanism, the same preferably consists of three separate nests of gears or units indicated generally by the reference numerals 52, 54 and 56. The nests of gears 54 at 56 together constitute a three speeds forward and reverse transmission unit and the nest of gears 52 provides another transmission unit. No claim is made to the transmission disclosed in Figure 10; accordingly, the same is only briefly described. The nest of gears making up the unit 52 may consist of two planetary gear units controlled by a sliding clutch 58, movable, by means of a crank 60, Figures 2 and 10, to establish the transmission unit 52 either in high gear or low gear or in neutral. As disclosed in Figure 2 the crank 60 is connected to the upper end of a shaft 64 and this shaft is journalled in bearings, not shown. To the lower end of the shaft 64 there is connected a crank 66 extending outside the casing of the transmission. As disclosed in Figure 10 the transmission unit 52 serves to interconnect the internal combustion engine 26 with the transmission unit 54, 56 and the unit 52 is neutralized, by the hereinafter described transmission operating mechanism constituting my invention, before either of the units 54 or 56 is neutralized preliminary to the operation of establishing the remaining unit in gear.

The transmission unit 52 is connected to the units or nests of gears 54 and 56 by means of a pinion 68, ring gears 70 and 72 meshed with said pinion and shafts 74 and 76 connected respectively with the gears 70 and 72. The nest of gears 54 includes gears 78 and 80 rotatably mounted on the shaft 76 and a clutch member 82 slidably mounted and drivably connected with said shaft. The gears 78 and 80 are meshed with gears 84 and 86 respectively, the latter gears being drivably connected to a drive shaft 88 which is coupled at one of its ends with a magnetic slip clutch and final drive 89 and at its other end with a similar drive mechanism, not shown. The sliding clutch 82 is actuated by means of a crank 90 forked at its end to embrace the gear, all as disclosed in Figures 2 and 10. As disclosed in Figure 2 the crank 90 is connected to the upper end of a shaft 92 and this shaft is journalled in bearings not shown. To the lower end of the shaft 92 there is connected a crank 94 lying outside the casing of the transmission. To operate the unit 54 the crank 90 is rotated to mesh the clutch 82 with the gear 80 to establish the unit in its high gear setting, or mesh the clutch 82 with the gear 78 to establish the unit in its low gear setting or position the clutch 82 in its transmission neutral position as disclosed in Figure 10, that is in position between the gears 78 and 80 and out of mesh therewith.

Briefly describing the unit 56 the same includes a sliding gear 96 slidably mounted on and drivably connected with the shaft 74, said gear being either moved into mesh with an idler gear 98 to effect a low gear setting of the transmission unit or into mesh with a gear 100 to effect a reverse gear setting of the transmission unit. The idler gear 98 is in constant mesh with a gear 102 drivably connected with the drive shaft 88. The nest of gears 56 are shown diagrammatically in Figure 10, the idler gear 98 being shown out of its true position, that is a position beneath the gear 102 where it may be meshed with the sliding gear 96. The latter gear is preferably operated by the forked end of a crank 104, Figures 2 and 10, and is shown in its transmission neutral position in Figure 10, that is a position where it is out of mesh with both the gear 100 and the gear 102. As disclosed in Figure 2 the crank 104 is connected to the upper end of a shaft 106 journalled in bearings, not shown. To the lower end of the shaft there is connected a crank 108 lying outside the casing of the transmission.

Referring now to Figures 1 and 2 disclosing one embodiment of the six speeds forward and two speeds reverse transmission operating mechanism constituting my invention, there is provided a manually operated selector mechanism positioned adjacent the driver's seat 12. This mechanism, as with the corresponding selector mechanism disclosed in Figure 3, includes two levers and the parts of said mechanism are so constructed and arranged that it is possible to move one or the other of said levers to establish one or the other of the units 54 and 56 in gear when and only when the remaining lever is positioned to neutralize the other of said transmission units.

In the transmission operating mechanism of Figures 1 and 2 the selector lever mechanism includes two levers 110 and 112 approximately one-half of each lever being housed within a box 114. The lever 110 which is preferably longer than lever 112, is movable through slots in the detachable top plate 115 of the box 114, the extremities of said slots being indicated by the reference numerals 1–6 inclusive. The lever 110 outlines the letter H in successively moving to the positions 1 to 4 inclusive, outlines another letter H in successively moving to the positions 3 to 6 inclusive and outlines yet another letter H in successively moving to the positions 1, 2, 5 and 6. These gear shifting movements of the lever 110 are effected in cooperation with an operation of the lever 112, all as is described hereinafter. As disclosed in Figure 2 the lever 112 extends through a slot in the top plate 115 and, as described above, may be moved from its transmission neutral position, that is the position of the lever disclosed in Figure 2, to either its low gear position, indicated by the word "Low," or to its reverse gear position, indicated by "Rev," when and only when the lever 110 is positioned somewhere in the slot 1, 2 that is when the transmission unit 54 is neutralized.

Continuing the description of the transmission operating mechanism disclosed in Figures 1 and 2, the selector levers 110 and 112 are connected by three separate force transmitting means with the aforementioned cranks 60, 94 and 104. Describing these three force transmitting means and associated parts including interlock means, there are provided two support members 116 and 118, Figure 2, secured to some part of the chassis of the tank or a part fixedly secured thereto. The support member 116 is provided with two cylindrical openings, one of said openings receiving therethrough a rod 120 having bifurcated ends. The lever 112 is straddled by the furcations of one end of the rod 120 and a pin 122 extending through said furcations and lever serves as a means for pivotally connecting said lever and rod. The lever 112 is pivotally mounted, that is fulcrumed, upon a pin 124 extending through said lever intermediate its ends and through the furcations of the bifurcated end of a curved support arm 126 secured to and extending from the support member 116. The lever 110 is pivotally mounted, intermediate its ends, upon a pin 128 extending through said lever and the furcations of the bifurcated end of a curved arm 130. The latter arm is preferably cylindrically shaped at its lower end 132, Figure 4, said end being sleeved over and keyed by a pin 134, to a tubular member 136 which extends through one of the openings in support member 116. Through the lower end of the lever 110 there extends a pin 137, the ends of said pin extending through furcations of the bifurcated end of a rod 138; and said rod extends through the tubular member 136. Completing the description of the force transmitting means interconnecting the lever 112 with the crank 108, the furcations at one end of the rod 120 receive a pin 140 which extends through the end of one arm of a bell crank lever 142 which is pivotally mounted on a portion of the support member 118, all as disclosed in Figure 2. A rod 144, bifurcated at both of its ends, is pivotally connected at one of said ends, to an arm of the bell crank lever 142 and is pivotally connected at its other end to the aforementioned crank 108. The nest of gears 56 is therefore connected with the selector lever 112 by force transmitting means including rod 120, bell crank lever 142, rod 144, crank 108, shaft 106 and crank 104.

Figures 2, 6:
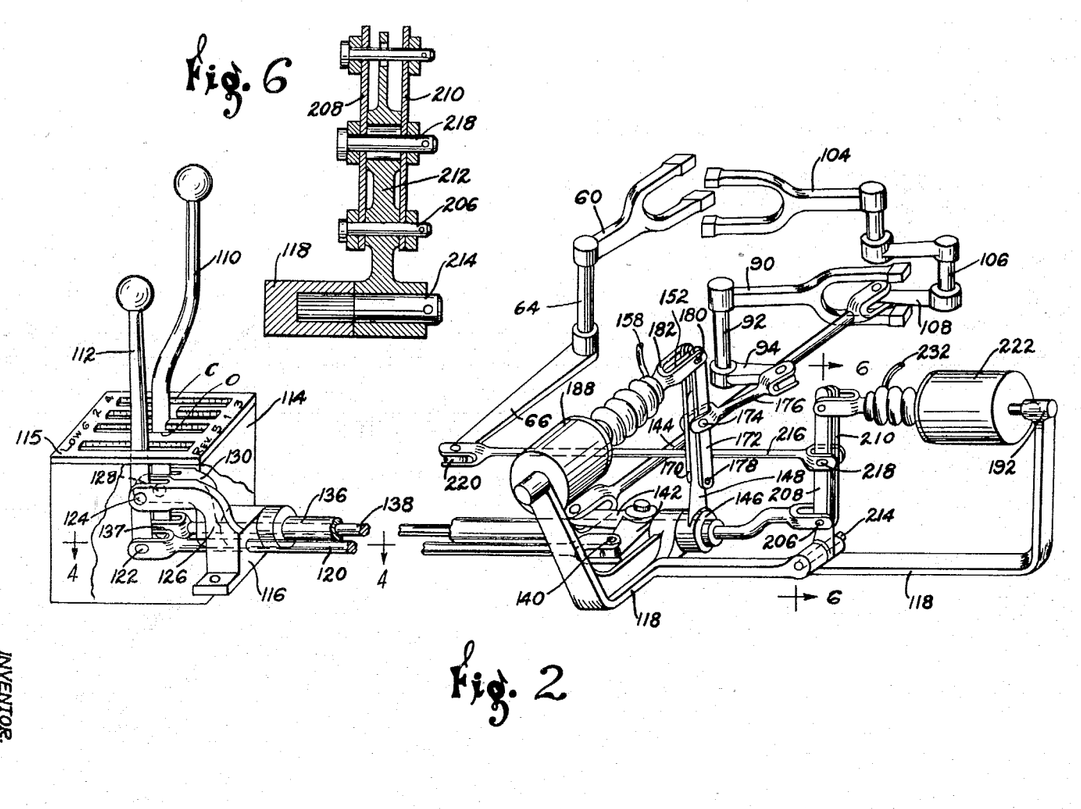
Figure 6 is a sectional view, taken on the line 6—6 of Figure 2, disclosing a part of the linkage interconnecting a part of the selector lever mechanism, a part of the transmission mechanism and a pressure differential operated motor, said linkage serving to effect the follow-up operation of the control valve of said motor and also to effect the so-called feel of the mechanism.

Completing the description of the force transmitting means for operating the nest of gears 54, the tubular member 136 is enlarged at one of its ends to provide a hub portion 146 from which extends a crank 148. The upper end of the arm 148 is pivotally connected to a link 152, Figure 7, said link being welded at 154 to a relatively short nipple 156. As disclosed in Figure 1 a flexible conduit 158 is connected to interconnected pipes 160 and 162, the latter being connected to the intake manifold of the internal combustion engine 26. The nipple 156 is connected at 164 to a hollow rod and the other end of said rod is tightly fitted within a recess in the end of a spool-shaped valve member 168. Reaction lever members 170 and 172, Figure 2, are pivotally connected intermediate their ends, to a pin 174 mounted in the furcations of the bifurcated end of a link 176 pivotally connected at its other end to the aforementioned crank 94. The pin 174 extends through an opening in the crank 148 to make possible a relative movement of said crank and the lever members 170 and 172, all as described hereinafter. The construction and arrangement of the lever members 170 and 172 and crank 148 duplicate the corresponding elements of the mechanism disclosed in Figure 6. This figure of the drawing discloses a part of the force transmitting means interconnecting the lever 110 and transmission unit 52. The lever members 170 and 172 are pivotally connected by a pin 178 to the crank 148 and the upper ends of said members are pivotally connected by a pin 180 to the yoke-shaped end 182 of a hollow connecting rod 184. The arms of the yoke 182 straddle the link 152 and nipple 156, all as disclosed in Figures 7, 8, and 9. The pin 180 extends through an opening in the end of the crank 148, thereby making possible a relative movement of the crank 148 and lever members 170 and 172. The power element, that is piston 186, of a pressure differential operated motor 188 is fixedly secured to a hereinafter described valve member 189 constituting the end portion of the connecting rod 184, said piston being reciprocable within the cylinder 190 of said motor. As disclosed in Figure 2 the motor 188 is pivotally mounted by a ball and socket connection 192, to an arm portion of the support 118. The aforementioned end portion 189 of the hollow rod 184 is ported at 194, 196, 198 and 200, said portion thereby constituting one of the two parts of the control valve of the motor 188, the remaining part being the aforementioned spool-shaped member 168. This valve member 168 is bored, as disclosed in Figures 7, 8 and 9 to provide ducts 202 and 204.

Describing now the third of the transmission operating force transmitting means, namely that force transmitting means for operating the transmission unit 52, the lever 110, as previously described, is pivotally connected at its lower end to the rod 138 which is slidably mounted within the aforementioned tubular member 136. As disclosed in Figures 2 and 8 the rod 138 is bifurcated at its other end and a pin 206 extends through the furcations of said end portion, through the lower end of reaction lever members 208 and 210 and through a crank 212 pivotally mounted upon a pin 214 tightly fitted within a recess in a portion of the support member 118. The furcations of the bifurcated end of a rod 216 are pivotally connected by a pin 218 to the lever members 208 and 210, said pin as disclosed in Figure 6, extending through an opening in the crank 212. The rod 216 is pivotally connected at 220 to the aforementioned crank 86 extending from the lower end of the shaft 64.

The remainder of the force transmitting means for operating the transmission operating unit 52 consists of a pressure differential operated motor 222 and the connection between the power element of said motor and the above described reaction levers 208 and 210. The construction and arrangement of the parts of said connections, the motor 222, the control valve housed therein and the connection between the valve and crank 212 duplicate the same parts disclosed in Figures 7, 8 and 9 and which parts have been described above.

Referring now to Figure 4, there is disclosed therein one of the important features of the invention disclosed in Figure 2, that is the interlock means cooperating with the slotted cover plate 115 of the box 114 to make possible a gear selecting operation of the nest of gears 56 when and only when the transmission unit 54 is neutralized; also to make possible a gear selecting operation of the nest of gears 54 when and only when the nest 56 is neutralized. This interlock means consists of a pin 224 housed within a slot in the support member 118, said slot extending parallel or substantially parallel to the base of said member. The ends of the pin 224 are rounded, one end being adapted to fit within an opening 226 in the tubular member 136 and the other end within a recess 228 in the rod 120. The operation of this interlock mechanism is described hereinafter.

Describing now the operation of the above described transmission operating mechanism, that is the mechanism disclosed in Figures 1, 2, 4, 6, 7, 8, 9 and 10, when the driver wishes to start the tank in motion in first gear or what may also be termed low, low gear, he will probably first disengage the friction clutch by depressing the clutch pedal 16 regardless of whether or not the transmission unit 52 is in neutral. Then after the engine is cranked, thereby idling the same to create a source of vacuum in the intake manifold, the driver will, if the three units 52, 54 and 56 are not already neutralized, move the selector levers 110 and 112 to the positions disclosed in Figure 2, that is their position to neutralize said transmission units. The lever 112 is then positioned in the center of the low reverse slot in the plate 115 and the lever 110 is positioned in the center of the slot which may be defined as slot 1, 2 and is also positioned in the center of the cross-over slot indicated by the letters C and O and extending across the plate 115. Now when the selector lever 110 is in its transmission neutral position as disclosed in Figure 2 the pin 224 registers with the opening 226 in the tubular member 136 thereby making it possible to move the lever 112 to either its low gear or reverse gear position indicated by the aforementioned indicia "Low" and "Rev" in Figure 2; for upon examining Figure 4 it will be noted that when the rod 120 is moved in either direction the pin 224 will be moved bodily, one end of the same moving into the opening 226 and the other end being forced out of the recess 228.

At this juncture it is also to be noted that by virtue of the above described interlock mechanism it is not possible to move the selector lever 110 laterally to operate the unit 54 if the selector lever 112 is in either its low gear or reverse gear position; for when the unit 56 is established in either low or reverse gear the end of the pin 224 is positioned in the opening 226 thereby preventing a rotation of the lever 110. In other words, as stated above, it is impossible by virtue of the interlock mechanism of the invention, to establish the unit 54 in gear when the unit 56 is in gear and vice versa it is impossible to establish the unit 56 in gear when the unit 54 is in gear.

Continuing the description of the operation of the mechanism to establish the transmission mechanism in low, low gear, the driver will move the shift lever 112 to the position marked "Low" thereby manually operating the crank 108 to establish the unit 56 in its low gear setting. The driver will then move the selector lever 110 to its low gear position, that is the position indicated by the reference numeral 1, thereby establishing the unit 52 in its low gear setting and establishing the entire transmission mechanism in its low, low or first gear setting.

Figure 7:
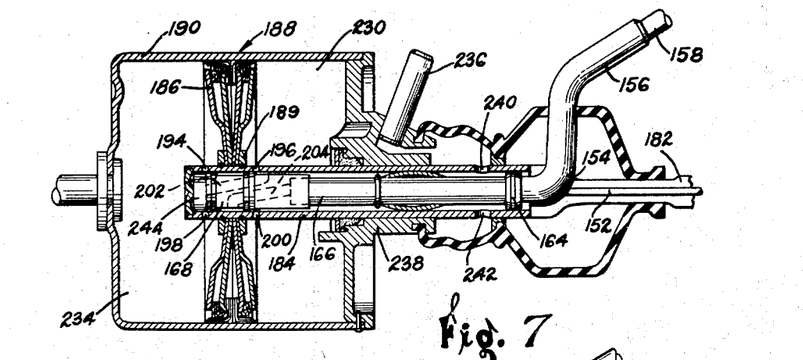
Figure 7 is a longitudinal sectional view disclosing the details of one of the pressure differential operated motors of the transmission operating mechanism constituting my invention, the piston, that is power element of said motor, and the parts of the control valve of said motor being in their transmission neutral position.
Figure 8:
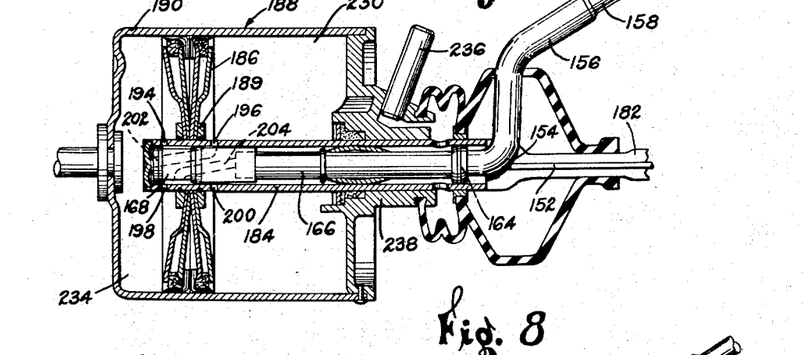
Figure 8 is a view similar to Figure 7 disclosing the power element of the pressure differential operated motor in one of its operative positions, that is in one of its gear established positions.
Figure 9:
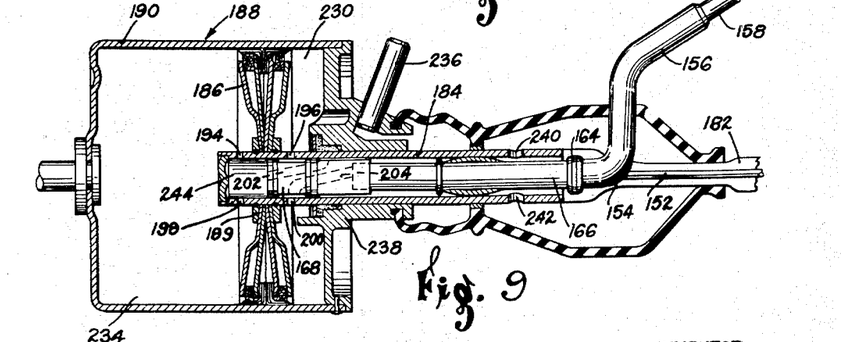
Figure 9 is a view, similar to Figure 8, disclosing the power element of the pressure differential operated motor in the other of its gear established positions.

Describing now the operation of the pressure differential operated motor 222 which description also applies to the motor 188, the two motors being of identical construction; and also describing the operation of the force transmitting means interconnecting the selector lever 110 with the crank 66, when said lever is moved from its transmission neutral position toward its low gear position, the rod 138 is tensioned to move the same to the left, Figure 2, thereby rotating the crank 212 counterclockwise and rotating the reaction levers 208 and 210 clockwise about the pin 218. The pin 218 is held stationary at this time inasmuch as the force necessary to move the rod 216 and the sliding clutch 58 connected thereto is greater than the force required to move the piston of the motor 222 to the right, Figure 2. At this juncture it is to be remembered that as to the motor 222, the piston, valve and other parts therein are duplicates of the corresponding parts of the motor 188 disclosed in Figures 7, 8 and 9. In the following description of the operation of the motor 222 reference will be made therefor to the parts of the motor 188. Now the aforementioned rotation of crank 212 and the reaction levers 208 and 210 results in a relatively quick valve opening movement of the valve members 168 and 189; for the piston 186 and the valve member 189 connected therewith are moved to the right, Figure 2, and the valve member 168 is moved to the left. Referring now to Figures 7 and 9, the piston 186 and the valve member 189 will, with this operation, be moved to the left from the transmission neutral position of said members disclosed in Figure 7; and the valve member 168 will be moved to the right. The valve members then assume the relative positions disclosed in Figure 9; however, said members will be located near the center of the cylinder 190. A compartment 230 of the pressure differential operated motor is by this valve opening or valve cracking operation connected to the intake manifold of the engine 28 via a conduit 232, nipple 158, hollow rod 166, duct 204 in the valve member 168 and the ports 196 and 200 in the valve member 189. A compartment 234 of the motor is, by this operation of the valve mechanism, connected to the atmosphere via a nipple 236 mounted in an end plate 238 of the cylinder 190, ports 240 and 242 in the hollow connecting rod 184, the duct 202 in the valve member 168, a compartment 244 outlined by the end of the rod 184 and the end of the valve member 168, and ports 194 and 198 in the valve member 189. The compartment 230 is then partially evacuated and this results in the piston 186 being subjected to a differential of pressures with a consequent movement to the left, Figure 2, to establish the transmission unit 52 in its low gear setting; and it is to be noted that the piston 186 and the valve member 189 connected thereto are moved to the right in Figure 2 when the valve is opened and that these parts then reverse their direction of movement when the motor is energized, all as just described.

Now when the sliding clutch 58 of the transmission unit 52 contacts the gear or other member to be meshed therewith, said clutch 58 will be momentarily stopped, whereupon the force exerted by the piston 186 to mesh said gears will be increased by virtue of the fact that the efflux of air from the compartment 230 is continued so long as said compartment remains connected to the intake manifold. The period of interruption of movement of the clutch 58 will of course be of very short duration inasmuch as said gear, which is covered with lubricant, will quickly slip into mesh with the gear to be interlocked therewith. Now it is to be noted that as a result of this interruption and the above referred to continued evacuation of air from the compartment 230, the resistance to movement of the selector lever 110 will be increased in direct proportion to the increase in differential of pressures acting on the piston 186; and this reaction or resistance to movement of the selector lever 110 is known in the art as feel. Explaining the operation of the mechanism to effect this so-called feel, it is to be noted that the reaction levers 208 and 210 are, with the above described operation of the force transmitting linkage, acting as levers of the first class, the fulcrum of said levers being located at the pin 218 and the two loads upon the levers being exerted at their ends. It follows therefore that as the load exerted by the piston 186 increases, said load being applied at the pin 218, the load exerted by the physical effort of the driver increases, said load being applied at the pin 206. It follows therefore that throughout the entire operation of moving the clutch 58 from its transmission neutral position to its meshed position the driver will do a part of the work to effect this meshing of the gears, the amount of said work and the amount of force exerted by the driver being directly proportional to that effected by the pressure differential operated motor.

It is also to be noted that the above described transmission operating mechanism provides what is known in the art as a follow-up control of the motor; for if perchance the driver should stop the movement of the selector lever 110 before the gear 58 abuts the clutch or other member with which it is meshed then the movement of the pin 206 will be stopped. The movement of the pin 218 will, however, be continued until the valve mechanism is lapped to place the system in equilibrium. Describing this lapping operation of the valve mechanism and referring to Figure 9, when the valve part 189 is moved to the right sufficiently to bring the ports 196 and 200 over a land portion 246 of the valve member 168, then the compartment 230 will be cut off from the intake manifold and the parts of the mechanism will remain in their then existing relative positions, that is the lapped position of the valve mechanism, until the selector lever 110 is again moved to crack the valve mechanism.

It is also to be noted that if for any reason the motor 222 should fail to function the transmission unit 52 would then be operated solely by the physical effort of the driver; for after the clearance between the pin 218 and the surrounding opening in the crank 212 is taken up, then the rod 216 would be moved solely by said physical effort.

At this juncture it may also be observed that if the transmission units 52 and 54 are each equipped with a synchronizing mechanism to provide what is known in the art as a synchro-mesh transmission, then the above described follow-up feel operations of the transmission operating mechanism of my invention will be particularly effective to control the operation of said transmission units; thus when the clutches or blockers of said synchro-mesh mechanism are operating to synchronize the speeds of the gears to be meshed, the driver will, by virtue of the above described resistance to movement of the selector lever 110, be conscious of the operation of the synchronizing mechanism and will probably refrain from unnecessarily forcing the selector lever toward its gear established position. During the operation of the synchronizing mechanism the control valve, by virtue of the yielding of the clutch facings of the synchronizing mechanism, will probably be lapped thereby limiting the force exerted by the pressure differential operated motor.

Briefly reviewing the description of the operation of the piston and valve parts, when the transmission unit 52 is in its neutral position, said piston and valve parts are in the position disclosed in Figure 7 and when said transmission unit is established in its low gear setting the piston and valve parts are in the positions disclosed in Figure 9.

Continuing now the description of the operation of the power plant as a whole, the transmission mechanism having been established in its low, low setting by the above described operation of placing the transmission units 52 and 56 in their low gear settings, the driver then re-engages the friction clutch by releasing the clutch pedal 16 and at the same time depresses the accelerator 28 to open the throttle and speed up the engine. When the tank has reached the desired speed in the low, low setting of the transmission, the driver will then probably operate the transmission to establish the same in its high, low, that is second gear, setting. This is effected by first disengaging the friction clutch to uncouple the engine from the transmission mechanism and then moving the selector lever 110 from its low gear position to its high gear position indicated by the reference numeral 2, Figure 2. With this operation, the rod 138 is placed in compression thereby effecting a counterclockwise rotation of the valve operating reaction levers 208 and 210 and a clockwise rotation of the valve operating crank 212. The motor 222 is thus again energized and this operation of the motor serves, together with the physical effort of the driver, to establish the transmission unit 52 in its high gear position. As to this operation of the motor 222 and the other parts of the force transmitting means for operating the transmission unit 52, the cycle of operations of the valve operating and force transmitting linkage will not be given in detail inasmuch as said operations are merely the reverse of the heretofore described operations for effecting the low gear setting of said transmission unit. It will suffice to say that the valve members 168 and 189 are first moved from the relative positions disclosed in Figure 9 to the relative positions disclosed in Figure 8, not the actual positions of these parts as disclosed in Figure 8, whereupon the compartments 234 and 230 are connected to the intake manifold and the atmosphere respectively. The piston 186 then moves to the left to the position disclosed in Figure 8 thereby moving the clutch member 58 to its meshed position to establish the transmission unit 52 in its high gear position. The transmission mechanism as a whole is then established in its second gear setting. As to the above described follow-up operation of the valve members and the feel or resistance to movement of the selector lever, these functions of the mechanism are the same as those previously described in effecting the low, low or first gear setting of the transmission mechanism.

The transmission mechanism having been established in its second gear setting, the driver will then re-engage the friction clutch and depress the accelerator to increase the speed of the tank.

The desired speed of the tank having been attained the driver may then desire to establish the transmission mechanism in its third speed setting. As before, the accelerator is first released and the friction clutch disengaged whereupon the driver neutralizes the transmission units 52 and 56 by returning the selector levers 110 and 112 to their transmission neutral positions shown in Figure 2; and then the driver rotates the selector lever 110 to the right, Figure 2, into the center of the slot 3, 4, that is the position indicated by the letter O. This operation serves to rotate the tubular member 136 clockwise thereby rotating the crank 148 clockwise and the reaction levers 170 and 172 counterclockwise. This operation is possible inasmuch as the pin 174 is, for the reason described above, at the time stationary thereby acting as a fulcrum for the levers 170 and 172 and the crank 148 is provided with a relatively large opening, not shown, through which said pin extends. The valve members 168 and 189 of the motor 188 are therefore moved in opposite directions to crank the valve and the valve member 189 at the hub of the piston, then reverse its direction of movement, all as previously described. As previously described the motor 188 is thus energized, the crank 148 being moved counterclockwise thereby moving the gear 82 into mesh with the clutch 78 to establish the transmission unit 54 in its low gear setting.

To complete the third speed setting of the transmission mechanism the driver then moves the selector lever 110 in the slot 3, 4 to the end of said slot indicated by the reference numeral 3, Figure 2; and this operation serves to repeat the above described low gear operation of the force transmitting means for operating the transmission unit 52. In other words, the transmission unit 52 is again established in its low gear setting after the transmisson unit 54 is established in its low gear setting. The driver then re-engages the friction clutch and speeds up the tank to attain the desired speed in the third speed setting of the transmission.

To establish the transmission in its fourth gear ratio setting the driver, after again releasing the accelerator and disengaging the friction clutch to reverse the torque, moves the selector lever 110 to its fourth speed position indicated by the reference numeral 4 in Figure 2; and this operation serves to repeat the above described operation of establishing the transmission unit 52 in its high gear setting. The driver then reengages the friction clutch and depresses the accelerator to attain the desired speed of the tank.

To establish the transmission mechanism in its fifth gear ratio setting the driver, after releasing the accelerator, will in succession disengage the friction clutch, neutralize the transmission unit 52 by returning the selector lever 110 to its transmission neutral position O, then move said lever laterally through the cross-over slot C, O into the position C in the slot 5, 6 and lastly will move the lever 110 to the position indicated by the reference numeral 5. This cross-over operation of the selector lever 110 serves to effect an operation of the motor 188 to establish the transmission unit 54 in its high gear setting, the operation of the reaction levers 170 and 172 and crank 148 being just the reverse of the above described operation of said parts in establishing said transmission unit in its low gear position; and by moving the lever 110 from the position C to the position 5 in the slot 5, 6 the motor 222 is again energized to again establish the transmission unit 52 in its low gear setting.

To complete the forward speed cycle of shifting operations of the six speeds forward and two speeds reverse transmission mechanism 10, the driver, after the tank has attained the desired speed in the fifth speed setting of said transmission mechanism, moves the selector lever 110 to the position indicated by the reference numeral 6 in Figure 2; and this operation serves to again establish the transmission unit 52 in its high gear setting and complete the operation of establishing the transmission mechanism 10 in its sixth speed setting.

To effect the two reverse speed settings of the transmission mechanism 10 the driver first brings the tank to a stop with the engine idling whereupon he neutralizes the transmission units 52 and 54 by moving the selector lever 110 to the positions disclosed in Figure 2. He then, in succession, moves the selector lever 110 to its reverse speed position and the selector lever 112 to either its first or second speed positions depending of course upon the gear ratio desired.

Figures 3, 5:
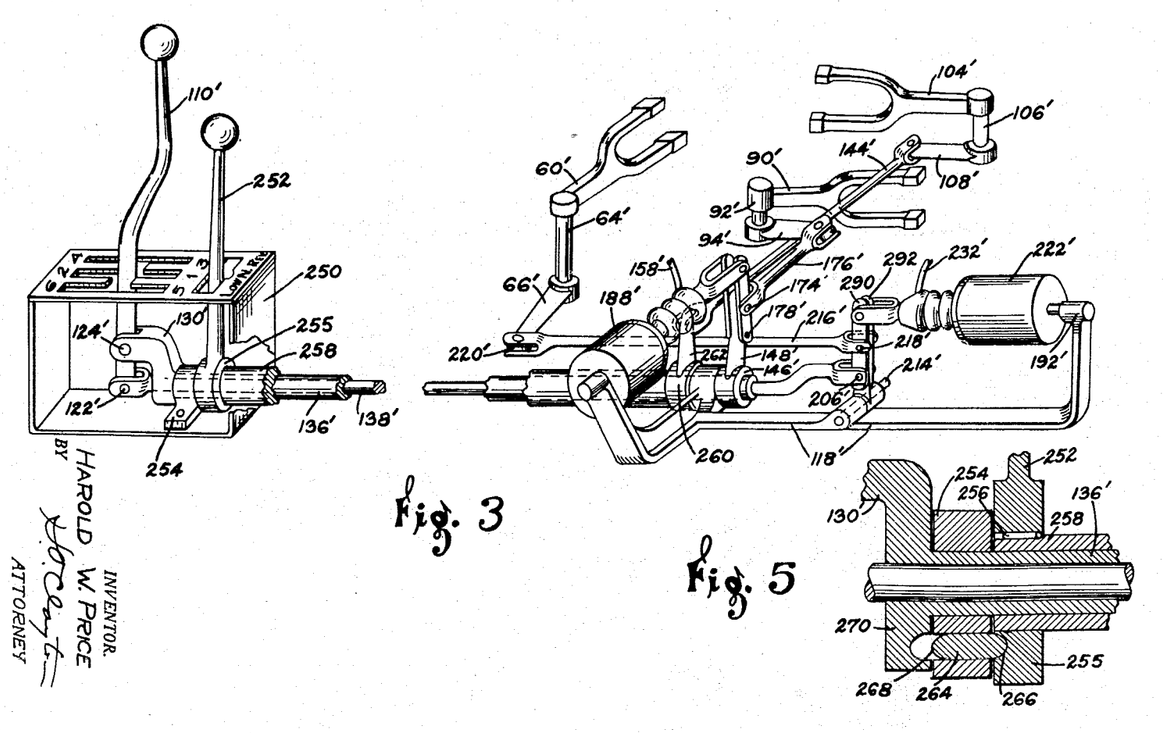
Figure 3 is a view, similar to Figure 2, disclosing another embodiment of the transmission operating mechanism constituting my invention.
Figure 5 is a vertical sectional view taken through a portion of the transmission operating means disclosed in Figure 3 and disclosing the details of the interlock mechanism.

There is disclosed in Figure 3 another embodiment of the transmission operating mechanism constituting my invention. Referring to this figure this embodiment of my invention duplicates the previously described embodiment disclosed in Figure 2 with the exception of the force transmitting means for operating the transmission unit 56; and there is also a simplification of the support member adjacent the box housing the selector levers. Those parts of the mechanism of Figure 3 which are duplicates of the corresponding parts in the mechanism of Figure 2 are indicated by the reference numerals of the latter parts plus a prime.

Describing the mechanism disclosed in Figure 3 which differs from the mechanism of Figure 2, the mechanism of Figure 3 includes a box 250 which may be detachably secured to the floor of the tank adjacent the driver's seat. This box, the sides and slotted top of which are preferably detachably secured together, serves to house selector levers 110' and 252 and a support member 254 which is preferably detachably secured in position. The two force transmitting means interconnecting the lever 110' with the transmission units 52 and 54, Figure 12, will not be described in detail inasmuch as said means duplicate the force transmitting means of the mechanism disclosed in Figure 2.

Describing in detail the force transmitting means for operating the transmission unit 56 the selector lever 252 extends through a slot in the top plate of the box 250 and is enlarged at its lower end to provide a hub portion 255, Figure 5, which is sleeved over and secured by a key 256 to a tubular shaft 258. As disclosed in Figure 5, the shaft 258 telescopingly receives a tubular member 136' and a rod 138', the latter being fitted within the member 136'. The other end of the shaft 258 is enlarged to provide a hub member 260 to which is secured a crank 262; and the force transmitting means interconnecting the crank 262 with the sliding gear 96 of the transmission unit 56 includes a rod 144', pivotally connected at one of its ends to said crank 262 and at its other end to a crank 108'. The crank 108' is connected to a shaft 106' journalled in bearings in the casing of the transmission 10; and a crank 104' forked at its end to embrace the gear 96 and connected to the shaft 106' completes the connection.

There is also provided, in the mechanism disclosed in Figure 3 means for preventing a meshing of gears of either the transmission unit 54 or the unit 56 when the other of said transmission units is established in gear. As disclosed in Figure 5 this interlock means consists of a pin 264 extending through an opening in the support member 254, said pin having rounded ends, one end 266 adapted to fit within a recess in the hub 255 when and only when the lever 252 is in its transmission neutral position and the other end 268 of said pin adapted to fit within a recess in a hub member 270 of a curved arm 130' when and only when the lever 110' is in position to neutralize the transmission unit 54. With this construction it is apparent that the selector lever 110' may be rotated to establish the transmission unit 54 in gear when and only when the selector lever 252 is in its transmission neutral position as disclosed in Figure 3; and the selector lever 252 may be rotated to establish the transmission unit 52 in gear when and only when the selector lever 110' is located somewhere in the slot 1, 2, preferably the center thereof.

The operation of the transmission operating mechanism of Figure 2 having been described in detail, it will not be necessary to describe at great length the operation of the mechanism disclosed in Figure 3. Suffice it to say that having moved the selector lever 110' into the slot 1, 2 to thereby neutralize the transmission unit 54, the selector lever 252 may then be moved to either its reverse or low gear position. Should any one of the third, fourth, fifth or sixth forward speed settings of the transmission mechanism be desired the driver, after reversing the driving torque by releasing the accelerator and disengaging the friction clutch, will first neutralize the transmission unit 56 by moving the selector lever 252 to its transmission neutral position N and he will then operate the transmission units 52 and 54 by moving the lever 110' to the position to effect these operations, that is to any one of the positions numbered 3, 4, 5 or 6 in the top plate of the box 250.

There is thus provided, as exemplified in the above described two embodiments of my invention, a simple and compact mechanism for operating a six speeds forward and two speeds reverse transmission mechanism of a motor vehicle, said transmission mechanism including two transmission units one of which preferably includes two separate units or nests of gears; and the motor vehicle having said transmission mechanism incorporated therein may be either a tank or an automotive vehicle.

In both of these embodiments the transmission operating mechanism constituting my invention preferably includes three separate transmission operating force transmitting means, two of which may include power means; and these three force transmitting means are actuated by a manually operated selector lever mechanism, including two lever members and interlock mechanism the parts of which are so constructed and arranged and so operative that one or the other of the nests of gears constituting one of the transmission units is neutralized before the remaining nest of gears may be operated to establish a gear setting.

This application is a division of my copending U. S. application No. 472,199, filed January 13, 1943.

Although only two embodiments of the invention have been illustrated and described, various changes in the form and relative arrangements of the parts may be made to suit requirements.

I claim:

1. In an automotive vehicle including two transmission units which cooperate to provide a six speeds forward and two speeds reverse transmission mechanism, means for operating said mechanism including a plurality of cranks connected to the transmission units, two separate manually operable shift levers conveniently mounted adjacent the driver's seat of the vehicle, force transmitting means interconnecting one of said levers with one of said transmission units, force transmitting means interconnecting the other of said levers with said transmission unit, means interlocking said two force transmitting means whereby either one of said levers may be actuated when and only when the remaining lever is established in a certain setting, and other force transmitting means interconnecting one of said two levers with the remaining transmission unit.

2. In a motor vehicle having a change-speed transmission mechanism consisting of two change-speed units connected in series and which mechanism is capable of establishing six different forward gear settings and two reverse gear settings, means for operating said transmission mechanism comprising three separate cranks extending from the casing of the transmission each crank being connected to gear operating means within the transmission casing and each crank having three operative positions and means for actuating said cranks including two manually operated levers positioned adjacent the driver's seat of the vehicle and further including means interconnecting said levers and cranks comprising two bearing members, a tubular member operably associated with the bearing members, means secured at one of its ends to one end of said tubular member and at its other end to one of said lever members, a rod telescoped within said tubular member and connected at one of its ends with one end of the last mentioned lever member, means interconnecting one end of said tubular member and one of said cranks, means interconnecting one end of said rod with another of said cranks and means interconnecting the other of the two aforementioned lever members with one of said cranks.

3. In a motor vehicle having a change-speed transmission mechanism consisting of two change-speed units connected in series and which mechanism may be established in any one of six different forward gear settings or two different reverse gear settings; means for operating said transmission mechanism comprising three separate cranks extending from the casing of the transmission mechanism, each crank being connected to gear operating means within the transmission mechanism and each crank having three operative positions, and means for actuating said cranks including two manually operated levers positioned adjacent the driver's seat of the vehicle, one of said levers constituting a part of the means for operating two of the aforementioned cranks and the other lever constituting a part of the means for operating the third crank, and means interconnecting said levers and cranks comprising interlock means for controlling the operation of said levers in their operation of actuating two of said cranks by preventing a gearmeshing movement of either one of said levers when the remaining lever is positioned out of its transmission neutral position.

4. In a motor vehicle having a change-speed transmission consisting of two change-speed units connected in series, said mechanism being capable of being established in any one of six different forward gear settings or two different reverse gear settings; means for operating said transmission comprising three separate cranks extending from the casing of the transmission, each crank being connected to gear operating means within the transmission casing and each crank having three operative positions, and means for actuating said cranks including two manually operated levers positioned adjacent the driver's seat of the vehicle and further including means interconnecting said levers and cranks comprising two bearing members, a tubular member journalled at its ends in said bearing members, means secured at one of its ends to one end of said tubular member and at its other end to one of said lever members, a rod telescoped within said tubular member and connected at one of its ends with one end of the last mentioned lever member, means including a pressure differential operated motor interconnecting one end of said tubular member and one of said cranks, means including a pressure differential operated motor interconnecting one end of said rod with another of said cranks, and means interconnecting the other of the two aforementioned lever members with one of said cranks.

5. In a motor vehicle having a change-speed transmission mechanism consisting of two change-speed units connected in series and which mechanism may be established in any one of six different forward gear settings or two different reverse gear settings; means for operating said transmission mechanism comprising three separate cranks extending from the casing of the transmission, each crank being connected to gear operating means within the transmission and each crank having three operative positions, and means for actuating said cranks including two manually operated levers positioned adjacent the driver's seat of the vehicle, and means interconnecting said levers and cranks including interlock means constituting part of the means for controlling the operation of two of said cranks, said interlock means serving to prevent a gear-meshing movement of either one of said levers when the remaining lever is positioned out of its transmission neutral position.

6. In a motor vehicle having a change-speed transmission mechanism consisting of two separate change-speed units connected in series and which mechanism may be established in any one of six different forward gear settings or two different reverse gear settings; means for operating said transmission mechanism comprising three separate force transmitting means connected with said transmission mechanism, manually operated lever mechanism including a lever member having an H-movement, and another lever member interlocked with the aforementioned lever member and having two operative positions to stablish certain of said gears in mesh and movable in but one plane; and means, including a plurality of shafts and a plurality of pressure differential operated motors, interconnecting said lever mechanism and force transmitting means the parts of said interconnecting means and lever mechanism being so constructed and so arranged that the last mentioned lever member may be operated to in part effect either one of two relatively low forward gear settings of the transmission or either one of the two reverse gear settings of the transmission provided the first mentioned lever member is positioned to effect a neutralization of a certain part of the transmission.

7. In a motor vehicle having a change-speed transmission which may be established in any one of six different forward speed settings or two different reverse speed settings comprising two separate change-speed units connected in series; power means for operating said transmission mechanism comprising three cranks connected to the transmission mechanism, two interlocked manually operated lever members mounted adjacent the driver's seat of the vehicle, two separate pressure differential operated motors, force transmitting means interconnecting one of said lever members, the two motors, and two of said cranks, and other force transmitting means interconnecting the other lever member with the remaining crank.

8. In a motor vehicle having a change-speed transmission mechanism which may be established in any one of six different forward speed settings, or two different reverse speed settings said mechanism comprising two separate transmission units connected in series, means for operating said transmission mechanism comprising three cranks connected to the transmission mechanism, two of said cranks serving to operate one of the transmission units, two manually operated interlocked lever members, force transmitting means, including a plurality of pressure differential operated motors, interconnecting one of said lever members and two of said cranks, and other force transmitting means interconnecting the other lever member with the remaining crank.

9. In a motor vehicle having as a part of its power plant a six speeds forward and two speeds reverse transmission consisting of two change-speed transmission units connected in series; means for operating said transmission comprising interlocked manually operated lever mechanism, and means, including a plurality of shafts and a plurality of pressure differential operated motors, interconnecting said lever mechanism and transmission, the parts of said lever mechanism being so constructed and arranged that a part of said mechanism may be operated to in part effect one or the other of two relatively low gear settings of the transmission or one or the other of two reverse gear settings of the transmission provided another part of said lever mechanism is positioned to effect a neutralization of a certain part of the transmission.

10. In an automotive vehicle provided with a six speeds forward and two speeds reverse change-speed transmission mechanism consisting of two transmission units, one of said units including two separate nests of gears and the other of said units including but one nest of gears, means for operating said transmission units comprising two lever members one of said members constituting part of the means for operating one of the aforementioned two separate nests of gears and also constituting part of the means for operating the nests of gears in the second mentioned unit, and the other of said lever members constituting part of the means for operating the other of the aforementioned two separate nests of gears, and means interconnecting said lever members and transmission mechanism comprising a plurality of pressure differential operated motors, the parts of the aforementioned mechanism being so constructed and arranged that the gears of either of said two separate nests of gears must be neutralized before the gears of the other nest may be operated to establish a gear setting.

HAROLD W. PRICE.

REFERENCES CITED

The following references are of record in the file of this patent:

UNITED STATES PATENTS

| Number | Name | Date |
|---|---|---|
| 948,583 | Barnes | Feb. 8, 1910 |
| 983,864 | Smith | Feb. 7, 1911 |
| 1,081,763 | Meyers | Dec. 16, 1913 |
| 1,172,341 | Bullard | Feb. 22, 1916 |
| 1,184,874 | Rider | May 30, 1916 |
| 1,629,666 | Keeler | May 24, 1927 |
| 1,993,015 | Moorhouse | Mar. 5, 1935 |
| 2,203,296 | Fleischel | June 4, 1940 |
| 2,323,384 | Eberhardt | July 6, 1943 |
| 2,355,626 | Bullard | Aug. 15, 1944 |
| 2,388,763 | Randol | Nov. 13, 1945 |
| 2,426,722 | Baade | Sept. 2, 1947 |

FOREIGN PATENTS

| Number | Country | Date |
|---|---|---|
| 27,422 | Great Britain | Dec. 12, 1902 |
| 8,791 | Great Britain | Apr. 22, 1908 |
| 23,139 | Great Britain | Oct. 6, 1910 |
| 293,006 | Germany | July 11, 1916 |
| 334,067 | Germany | Mar. 7, 1921 |

Certificate of Correction

Patent No. 2,531,701　　　　　　　　　　　　　　　　November 28, 1950

HAROLD W. PRICE

It is hereby certified that error appears in the printed specification of the above numbered patent requiring correction as follows:

Column 4, line 10, for "lower" read *power*; column 10, line 26, for "forcce" read *force*; line 70, for "gear" read *clutch*; same line, for "clutch" read *gear*; column 11, line 28, for "thus" read *for*; column 12, line 65, for "gear" read *clutch*; same line, for "clutch" read *gear*; column 17, line 24, for "stablish" read *establish*; line 44, strike out "power"; line 58, after "settings", first occurrence, strike out the comma, and insert the same after "settings", second occurrence, same line; column 18, line 30, for "nests" read *nest*;

and that the said Letters Patent should be read as corrected above, so that the same may conform to the record of the case in the Patent Office.

Signed and sealed this 6th day of November, A. D. 1951.

[SEAL]

THOMAS F. MURPHY,
　　　　　　　　　　　　　　　　　　　　*Assistant Commissioner of Patents.*